(12) United States Patent
Kennedy

(10) Patent No.: US 10,077,802 B2
(45) Date of Patent: Sep. 18, 2018

(54) TILTING PAD JOURNAL BEARING ASSEMBLY

(71) Applicant: BorgWarner Inc., Auburn Hills, MI (US)

(72) Inventor: Donald Michael Kennedy, Asheville, NC (US)

(73) Assignee: BorgWarner, Inc., Auburn Hills, MI (US)

( * ) Notice: Subject to any disclaimer, the term of this patent is extended or adjusted under 35 U.S.C. 154(b) by 357 days.

(21) Appl. No.: 14/879,338

(22) Filed: Oct. 9, 2015

(65) Prior Publication Data

US 2016/0115992 A1    Apr. 28, 2016

Related U.S. Application Data

(60) Provisional application No. 62/067,663, filed on Oct. 23, 2014.

(51) Int. Cl.
| | |
|---|---|
| *F16C 17/03* | (2006.01) |
| *F04D 17/10* | (2006.01) |
| *F04D 29/056* | (2006.01) |
| *F04D 25/02* | (2006.01) |

(52) U.S. Cl.
CPC .............. *F16C 17/03* (2013.01); *F04D 17/10* (2013.01); *F04D 25/024* (2013.01); *F04D 29/056* (2013.01); *F16C 2360/24* (2013.01)

(58) Field of Classification Search
CPC .................................. F16C 17/03; F04D 17/10
See application file for complete search history.

(56) References Cited

U.S. PATENT DOCUMENTS

| | | | | |
|---|---|---|---|---|
| 4,714,357 | A * | 12/1987 | Groth ...................... | F16C 17/03 384/312 |
| 5,393,145 | A * | 2/1995 | Ide ........................ | F16C 17/035 384/124 |
| 5,513,917 | A * | 5/1996 | Ide ........................ | F01D 25/164 384/100 |
| 5,795,076 | A * | 8/1998 | Ball ........................ | F16C 17/03 384/122 |
| 6,766,697 | B1 * | 7/2004 | Perez ...................... | F16C 17/03 73/760 |
| 8,348,595 | B2 * | 1/2013 | Koch ...................... | F01D 25/16 415/104 |
| 8,366,323 | B2 * | 2/2013 | Waki ...................... | F16C 17/03 384/117 |
| 2016/0123391 | A1 * | 5/2016 | Minegishi ............. | F04D 29/046 415/170.1 |
| 2016/0215815 | A1 * | 7/2016 | Ryu ...................... | F01D 25/186 |

* cited by examiner

*Primary Examiner* — Thomas R Hannon

(57) ABSTRACT

A tilting pad (80, 180) (TP) journal bearing (30, 32, 132) is used to support a rotating assembly of a turbocharger (10). The TP journal bearing (30, 32, 132) includes a cylindrical outer ring (60, 160) and tilting pads (80, 180) disposed within the outer ring (60, 160). The tilting pads (80, 180) are formed separately from the outer ring (60, 160) and secured thereto during assembly.

14 Claims, 4 Drawing Sheets

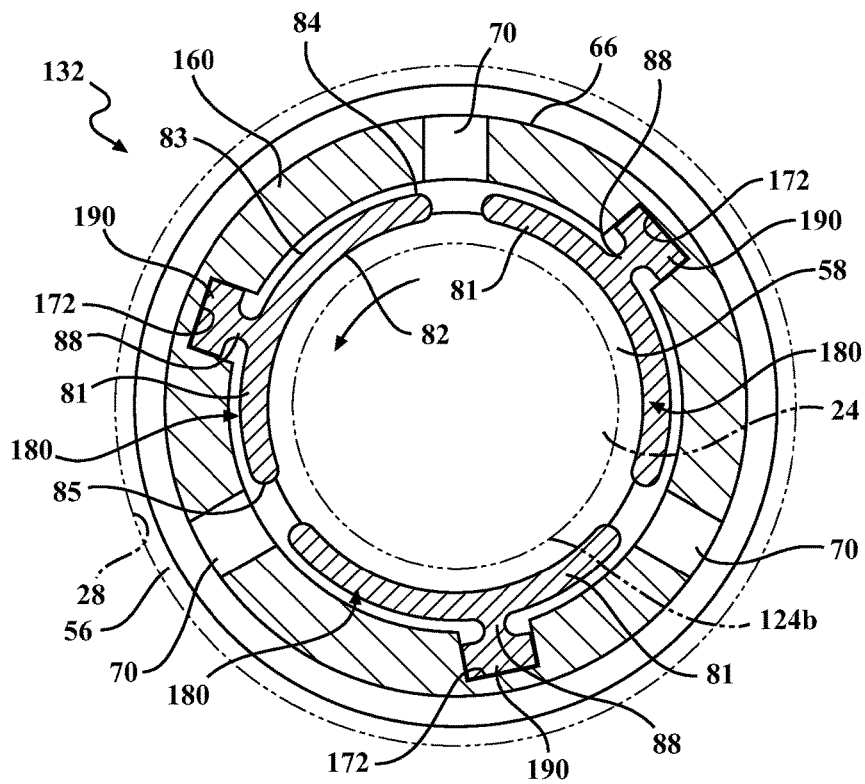
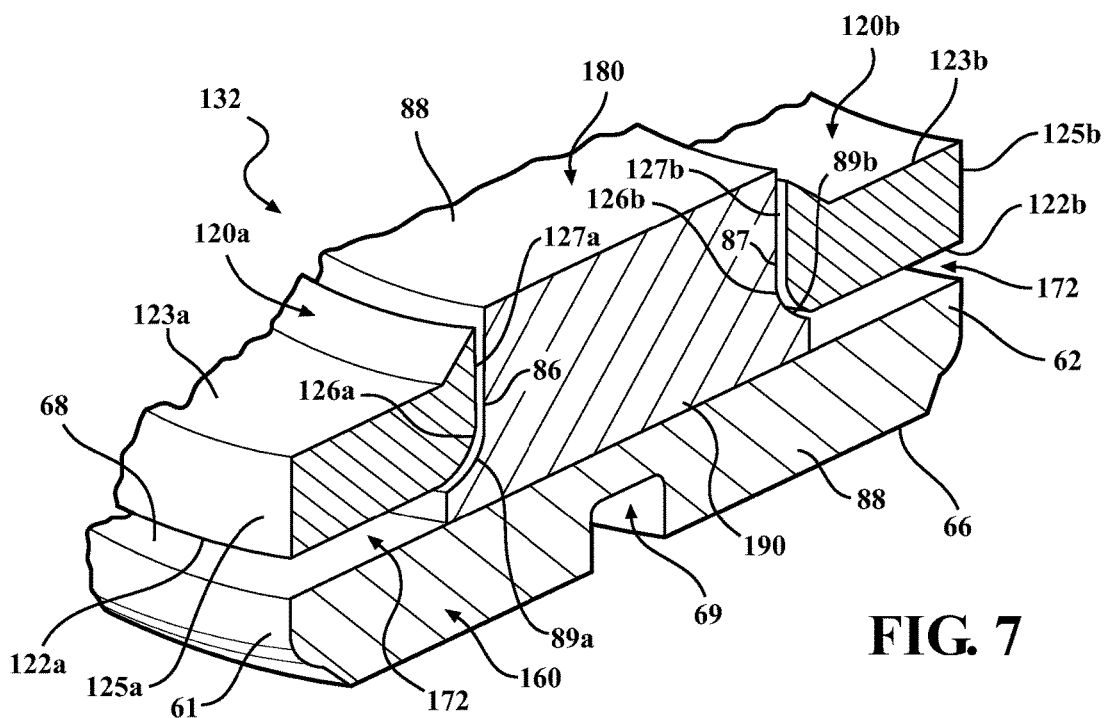

TILTING PAD JOURNAL BEARING ASSEMBLY

CROSS-REFERENCE TO RELATED APPLICATIONS

This application claims priority to and all the benefits of U.S. Provisional Application No. 62/067,663, filed on Oct. 23, 2014, and entitled "Flexure Pivot Tilting Pad Journal Bearing Assembly" which is incorporated herein by reference.

BACKGROUND

Field of the Invention

The present invention relates to a journal bearing for use in a turbocharger. More particularly, the present invention relates to a multi-piece journal bearing having tilting pads for radially supporting a shaft in a bearing housing of a turbocharger.

Description of Related Art

An exhaust gas turbocharger delivers compressed air to an engine intake, allowing more fuel to be combusted, thus boosting the horsepower of an engine without significantly increasing engine weight. Turbochargers typically include a turbine housing connected to the exhaust manifold of the engine, a center bearing housing, and a compressor housing connected to the intake manifold of the engine. A turbine wheel in the turbine housing is rotatably driven by an inflow of exhaust gas supplied from the exhaust manifold. A shaft is rotatably supported in the center bearing housing connects the turbine wheel to a compressor impeller in the compressor housing so that rotation of the turbine wheel causes rotation of the compressor impeller. As the compressor impeller rotates, it increases the air mass flow rate, airflow density and air pressure delivered to the cylinders of the engine via the intake manifold.

Journal bearings are typically seated in the center bearing housing between the shaft and the center bearing housing for rotatably supporting the shaft. In some turbochargers, hydrodynamic tilting pad (TP) journal bearings are used to support the shaft. A TP bearing is a type of bearing in which individual tilting bearing elements (e.g., pads) are arranged around the circumference of a rotating shaft. TP bearings can also be configured to serve as thrust bearings by placement of the pads along a thrust surface. In TP bearings, either rotation of the shaft or pressure created by an external pump causes the fluid in the bearing to press upon the tilting pads. The pressure causes the pad to tilt and creates a wedge of fluid between the bearing and the shaft or runner. The wedge is thickest at the leading edge of the bearing pad and thinnest at the trailing edge.

One advantage of a TP bearing is that the pads can move independently of each other and thus, a TP bearing is able to damp vibrations caused by rotation of the device. Another advantage is that the pads of the TP bearing can individually shift to accommodate various loading conditions, thus the bearing geometry is always optimized for load capacity and efficiency, and cross-coupled stiffness is reduced. Further advantageously, the TP bearing is inherently more stable than many other journal or thrust bearings and thus the TP bearing allows greater flexibility in the design, application, and manufacturing.

Some TP journal bearings are manufactured using a wire electric discharge machining (EDM) process to create the pad geometry on the inner surface of a bearing ring. However, manufacturing TP bearings using the wire EDM process is not feasible for high-volume production since, although the wire EDM process is very accurate, it is also very time consuming and expensive to perform.

SUMMARY

A TP journal bearing includes an outer ring and tilting pads disposed on an inner surface of the outer ring. The outer surface of the outer ring provides the outer bearing surface. The tilting pads, which provide the inner bearing surface, are formed separately from the outer ring and press fit into grooves formed on an inner surface of the outer ring. Since they are formed separately, the manufacturing process used to form the outer ring and pads is not limited since the geometry of each component can be created with commonly used machine equipment, reducing manufacturing costs relative to some conventionally manufactured TP bearings.

In some aspects a journal bearing includes a cylindrical outer ring and a tilting pad. The outer ring includes a first end, a second end, a longitudinal axis that extends through the first end and the second end, a radially outward-facing bearing surface, and an inner surface opposed to the radially outward-facing bearing surface. The inner surface includes an axially extending groove. The tilting pad includes a bearing member that is elongated in a circumferential direction and provides a radially inward facing bearing surface, an anchor portion, and a web that connects the bearing member to the anchor portion. The anchor portion is disposed in the groove in such a way that the pad is secured to the outer ring, and the bearing member is pivotable about the web relative to the outer ring inner surface.

The journal bearing may include one or more of the following features: The anchor portion is press fit within the groove. The groove is blind relative to the outer ring first end and the outer ring second end. The anchor portion has a pentagonal profile, and the groove has a curved profile. The web is disposed closer to a trailing end of the bearing member than to a leading end of the bearing member relative to a direction of rotation of the shaft. The journal bearing includes a retaining ring disposed within the outer ring, the retaining ring configured to retain the tilting pad within the outer ring. The retaining ring is press fit within the outer ring. The journal bearing includes a retaining ring disposed within the outer ring, the retaining ring configured to urge the anchor portion radially outward and into the groove. The journal bearing includes a retaining ring disposed within the outer ring, the retaining ring configured to control the flow of lubricating oil within the journal bearing. The journal bearing includes a first retaining ring disposed within the outer ring on a first axial side of the tilting pad and a second retaining ring disposed within the outer ring on a second axial side of the tilting pad.

In some aspects, a journal bearing includes a cylindrical outer ring, tilting pads disposed within the outer ring, a first retaining ring disposed within the outer ring on a first axial side of the tilting pads, and a second retaining ring disposed within the outer ring on a second axial side of the tilting pad. The first retaining ring and the second retaining ring are configured to secure the tilting pads within the outer ring.

The journal bearing may include one or more of the following features: The turbocharger includes a turbine wheel, a compressor impeller, and a shaft that connects the turbine wheel to the compressor impeller, the shaft supported for rotation within a bearing housing via a journal bearing. The journal bearing includes a cylindrical outer ring and a tilting pad. The outer ring includes a first end, a second end, a longitudinal axis that extends through the first end and the second end, a radially outward-facing bearing surface, and an inner surface opposed to the radially outward-facing bearing surface, the inner surface including an axially extending groove. The tilting pad includes a bearing member that is elongated in a circumferential direction and provides a radially inward facing bearing surface, an anchor portion, and a web that connects the bearing member to the anchor portion. The anchor portion is disposed in the groove in such a way that the pad is secured to the outer ring, and the bearing member is pivotable about the web relative to the outer ring inner surface.

The turbocharger may include one or more of the following features: The anchor portion is press fit within the groove. A retaining ring is disposed within the outer ring, the retaining ring configured to urge the anchor portion radially outward and into the groove. The journal bearing includes a first retaining ring disposed within the outer ring on a first axial side of the tilting pad and a second retaining ring disposed within the outer ring on a second axial side of the tilting pad.

BRIEF DESCRIPTION OF THE DRAWINGS

The invention will be readily appreciated by reference to the following detailed description when considered in connection with the accompanying drawings wherein:

FIG. 6 is a transverse cross sectional view of the bearing of FIG. 5; and

FIG. 7 is an enlargement of a portion of FIG. 5 showing details of the retaining rings of the bearing.

DETAILED DESCRIPTION

Figure 1:
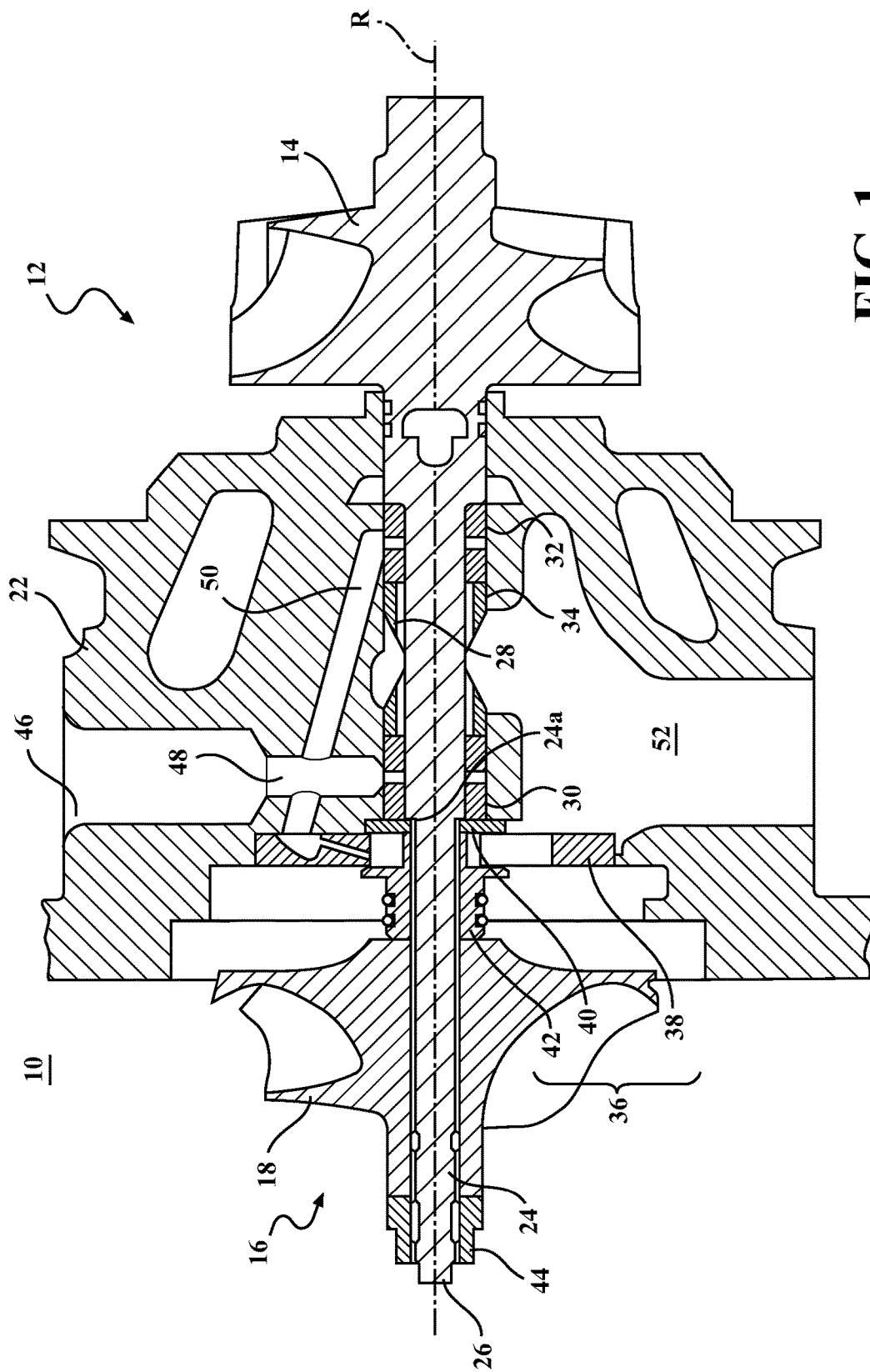
FIG. 1 is a cross-sectional view of an exhaust gas turbocharger including hydrodynamic tilting pad journal bearings.

Referring to FIG. 1, an exhaust gas turbocharger 10 includes a turbine section 12, a compressor section 16, and a center bearing housing 22 disposed between, and connecting, the compressor section 16 to the turbine section 12. The turbine section 12 includes a turbine housing (not shown) and a turbine wheel 14 disposed in the turbine housing. The compressor section 16 includes a compressor housing (not shown) and a compressor impeller 18 disposed in the compressor housing. The turbine wheel 14 is connected to the compressor impeller 18 via a shaft 24. The shaft 24 is supported for rotation about a rotational axis R within a bore 28 formed in the bearing housing 22 via a pair of axially spaced journal bearings 30, 32. For example, a compressor-side journal bearing 30 supports the shaft 24 adjacent the compressor section 16, and a turbine-side journal bearing 32 supports the shaft 24 adjacent to the turbine section 12. The journal bearings 30, 32 are fully-floating ring tilting pad (TP) bearings, as discussed further below.

The axial spacing between the compressor-side journal bearing 30 and the turbine-side journal bearing 32 is maintained by cylindrical a journal bearing spacer 34. In addition, a thrust bearing assembly 36, including a thrust bearing 38, a thrust washer assembly 40, and an oil flinger 42, is disposed in the bearing housing 22 so as to provide axial support for the shaft 24. The shaft 24 is reduced in diameter on the compressor side of the compressor-side journal bearing 30, and a shoulder 24a is formed at the transition between diameters. The compressor impeller 18 and the thrust bearing assembly 36 are supported on the shaft 24 in the reduced diameter portion. The terminal end 26 of the shaft 24 extends axially beyond the compressor impeller 18 and includes an external thread (not shown). A nut 44 engages the thread, and is tightened sufficiently to clamp the compressor impeller 18 and the thrust bearing assembly 36 against the shoulder 24a.

In use, the turbine wheel 14 in the turbine housing is rotatably driven by an inflow of exhaust gas supplied from the exhaust manifold (not shown) of an engine. Since the shaft 24 connects the turbine wheel 14 to the compressor impeller 18 in the compressor housing, the rotation of the turbine wheel 14 causes rotation of the compressor impeller 18. As the compressor impeller 18 rotates, it increases the air mass flow rate, airflow density and air pressure delivered to the cylinders of the engine via an outflow from the compressor section 16, which is connected to the air intake manifold (not shown) of the engine.

The turbocharger bearings 30, 32, 36 are lubricated by oil from the engine. Fluid, such as oil, is circulated in the center bearing housing 22 to lubricate the journal bearings 30, 32, shaft 24 and housing walls. The oil is fed under pressure into the bearing housing 22 via an oil supply port 46 to lubricate the bearing surfaces within and about the journal bearings 30, 32. More specifically, oil passes through individual bearing supply channels 48 and 50 to lubricate the thrust bearing assembly 36 and the journal bearings 30, 32. The supply channels 48 and 50 open at generally axially centered positions with respect to the two journal bearings 30, 32 such that oil flow may occur in both directions axially to lubricate the bearing surfaces. The journal bearings 30, 32 have axially-centered lubricating oil flow ports or radially-extending through holes 70 (See FIG. 2) that receive oil from the respective supply channels 48, 50. In some embodiments, oil making its way toward the compressor section 16 can be blocked by an insert and a sealing system between the bearing housing and the compressor housing as disclosed in BorgWarner's U.S. Pat. No. 8,348,595, which is incorporated herein by reference. Oil flowing over and through the journal bearings 30, 32 and thrust bearing assembly 36 is eventually collected within a bearing housing sump chamber 52 for return circulation.

Figure 2:
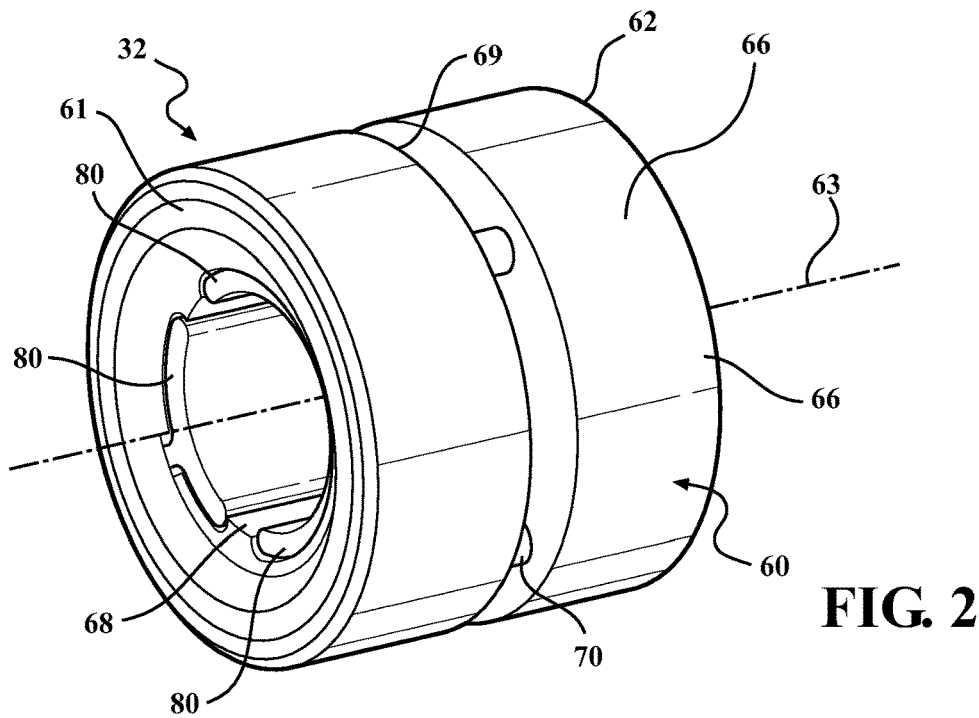
FIG. 2 is a perspective view of the compressor-side tilting pad journal bearing.
Figure 3:
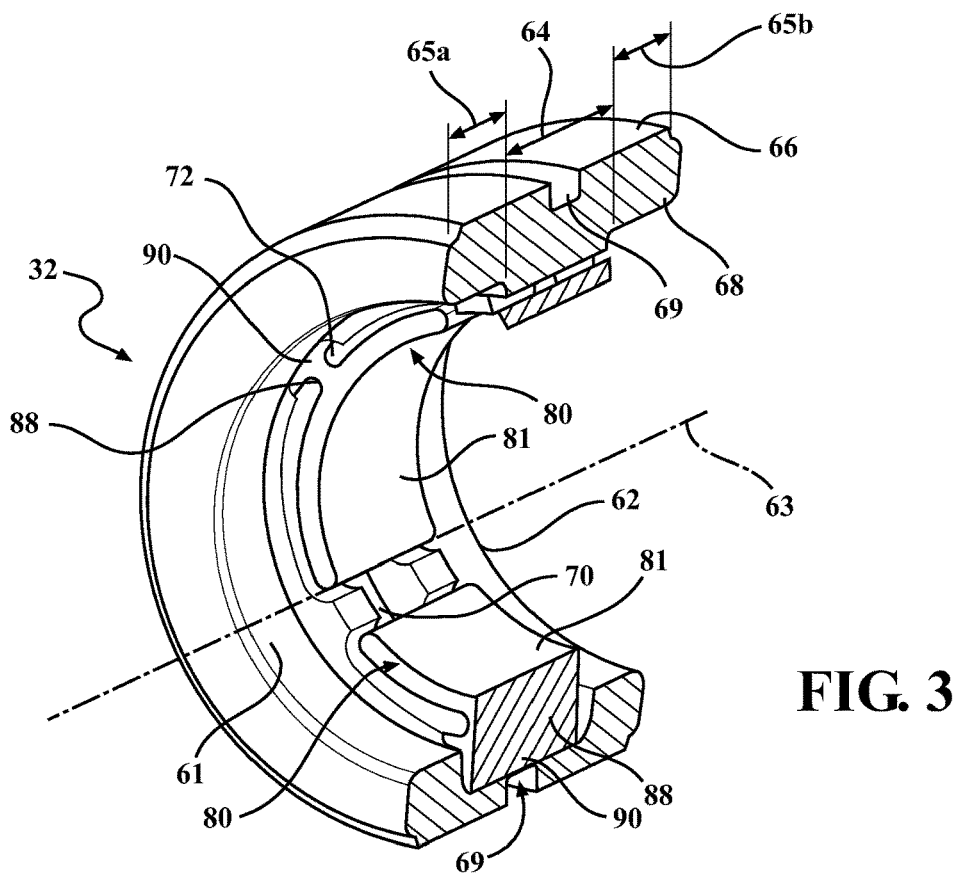
FIG. 3 is an axially cross-sectioned perspective view of the bearing of FIG. 2.
Figure 4:
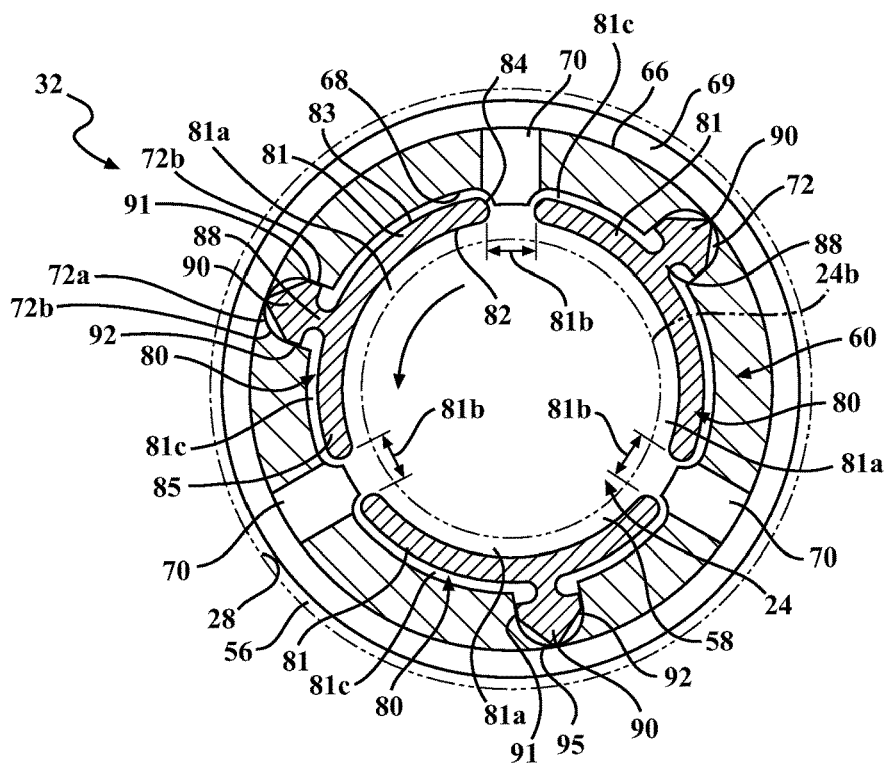
FIG. 4 is a transverse cross sectional view of the bearing of FIG. 2.

Referring to FIGS. 2-4, the fully-floating ring TP journal bearings 30, 32 are substantially structurally similar. For this reason, only the turbine-side journal bearing 32 will be described in detail.

The turbine-side journal bearing 32 includes a hollow, cylindrical outer ring 60 and tilting pads 80 that are secured to an inner surface 68 of the outer ring 60. The outer ring 60 has a first end 61, a second end 62 opposed to the first end 61 and a longitudinal axis 63 that extends between the first and second ends 61, 62. An outer bearing surface 66 of the outer ring 60 includes an axially-centered, circumferentially-extending groove 69 that receives lubricating oil and directs the lubricating oil into radially-extending through holes 70 formed in the outer ring 60. The radially-extending through holes 70 permit lubricating oil to pass from the outer bearing surface 66 of the outer ring 60 to an inner surface 68 of the outer ring 60, whereby lubricating oil is directed to the tilting pads 80. The outer bearing surface 66 is a radially outward-facing surface that is shaped and dimensioned to fit with relatively close clearance within the bore 28 formed in the center bearing housing 22, with sufficient gap (not labeled) to permit formation of an outer oil film 56 therebetween.

The inner surface 68 of the outer ring 60 includes a non-uniform thickness between the ring first end 61 and the ring second end 62. In particular, a central region 64 that is midway between, and spaced apart from, the first end 61 and the second end 62 has a wall thickness that is greater than a wall thickness of end regions 65a, 65b that bracket the central region 64 and adjoin the first and second ends 61, 62. Additionally, the inner surface 68 of the outer ring 60 has a smaller diameter within the central region than within the end regions 65a, 65b.

Three grooves 72 are formed in the inner surface 68 of the outer ring 60 wherein the three grooves 72 extend axially within the central region 64. The grooves 72 have a radiused profile when seen in side cross-section (FIG. 4). The grooves 72 have a curved bottom 72a formed between two sides 72b. The grooves 72 are sized and dimensioned to receive and retain anchor portions 90 of the tilting pads 80, as discussed further below.

The outer ring 60 can be formed by various manufacturing techniques utilizing a variety of known bearing materials, such as leaded or unleaded bronze, aluminum, etc.

The tilting pads 80 are formed separately from the outer ring 60. Each tilting pad 80 includes a bearing member 81, an anchor portion 90 that secures the tilting pad 80 to the outer ring 60 and a radially-extending web 88 that connects the bearing member 81 to the anchor portion 90. The bearing member 81 is shaped and dimensioned to fit with relatively close clearance about the shaft 24 with sufficient gap 81a for an inner oil film and provides improved control of radial bearing forces relative to some conventional journal bearings. The bearing member 81 has a width that is elongated and curved in a circumferential direction and that can correspond to the width of the ring central region 64, or that can be smaller or larger than the width of the ring central region 64. In the illustrated embodiment, the TP journal bearing 32 includes three tilting pads 80, and thus the circumferential length of the bearing member 81 is sufficient to extend along almost (e.g., slightly less than) a third of the inner circumference of the outer ring 60. Each bearing member 81 includes an inward-facing bearing surface 82 that faces the shaft 24, and an opposed, outward-facing surface 83 that faces the inner surface 68 of the outer ring 60. In addition, each bearing member 81 includes a leading end 84 and a trailing end 85, where the terms "leading" and "trailing" are used with respect to the rotational direction of the shaft 24. In the exemplary embodiment illustrated in FIG. 4, the rotational direction of the shaft 24 is counter-clockwise, as indicated using an arrow. A small circumferential gap 81b exists between the leading end 84 of one bearing member 81, and the trailing end 85 of the adjacent bearing member 81. Lubrication through the radially-extending holes 70 formed in the outer ring 60 is positioned to open into the circumferential gap 81b.

The radially-extending web 88 connects the bearing member outward-facing surface 83 to the anchor portion 90, and is located between the leading end 84 and the trailing end 85. The radially-extending web 88 is not centered between the leading and trailing ends 84, 85, and is instead offset to a location closer to the trailing end 85 than the leading end 84. This offset improves the function of the TP journal bearing 32, and the amount of offset can be used to tune the operating characteristics of the TP journal bearing 32. The radially-extending web 88 has an axial length that corresponds to an axial dimension of the bearing member 81. The radially-extending web 88 has a circumferential dimension that is small relative to a circumferential dimension of the bearing member 81, whereby the radially-extending web 88 is flexible and permits the bearing member 81 to pivot about an axis parallel to the ring longitudinal axis 63 relative to the anchor portion 90, and thus also to pivot relative to the outer ring 60. In addition, the radially-extending web 88 has length that is sufficient to provide a narrow gap 81c between the bearing member radially outward-facing surface 83 and the inner surface 68 of the outer ring 60.

The tilting pads 80 are secured to the inner surface 68 of the outer ring 60 via engagement of the anchor portion 90 with the groove 72. In particular, the anchor portion 90 is press-fit into the groove 72. In some embodiments, the anchor portion 90 has a pentagonal profile including an apex 95 centered along the curved bottom 72a of the groove 72 and sides 91, 92 that engage corresponding sides 72b of the groove 72.

The TP journal bearing 32 radially supports the shaft 24 within the center bearing housing 22, and functions to prevent contact therebetween and control the motion of the rotating shaft 24. In hydrodynamic lubrication, oil remains between the TP journal bearing 32, the shaft 24 and the bore 28, creating a fluid film and preventing metal-to-metal contact. The TP journal bearing 32 forms two hydrodynamic oil films; the outer film 56 between the center bearing housing bore 28 and the outer bearing surface 66, and an inner film 58 between the pad inward-facing bearing surface 82 and an outer surface 24b of the shaft 24, thereby allowing the TP journal bearing 32 to float between the inner and outer films 58, 56 in the center bearing housing 22. Additionally, the TP journal bearing 32 is allowed to freely spin or rotate around the shaft 24 without directly contacting the shaft 24 or center bearing housing 22.

In the fully-floating ring TP journal bearing 32, the inner oil film 58 and the outer oil film 56 both function as bearing surfaces. This can be compared to corresponding inner and outer oil films that are provided in a semi-floating ring TP journal bearing, in which the inner oil film functions as a bearing surface but the outer oil film functions as a damper. In this regard, the fully-floating ring TP journal bearing 32 is advantageous relative to some similar semi-floating ring TP journal bearings since, when in use, the fully-floating ring TP journal bearing 32 reduces power loss relative to the semi-floating counterpart.

During operation, the shaft 24 rotates at a first speed corresponding to the operating speed of the turbocharger 10. Since the fully-floating ring TP journal bearing 32 floats within the bore 28, the fully-floating ring TP journal bearing 32 rotates within the bore 28 relative to both the shaft 24 and the bore 28 at a second speed that is less than that of the shaft 24. In addition, the tilting pads 80 pivot about the radially-extending web 88 in response to movement of the shaft 24 and minimizes vibration between the shaft 24 and bearing housing 22, stabilizes the rotation of the shaft 24, turbine wheel 14 and compressor impeller 18, and thereby increases the durability and efficiency of the turbocharger while reducing vibration levels. Work is split between the outer bearing surface 66 of the bearing 32 outer ring 60 and the inward-facing bearing surface 82 of the tilting pad 80. By controlling and adjusting oil flow, a designer can adjust the floating characteristics of the bearing 32.

Thus, the TP journal bearings 30, 32 of the present invention provide a stable rotor-bearing system in the turbocharger with minimized bearing force transmitted to the bearing housing and small overall shaft motion response amplitude thereby providing increased durability and reduced noise, vibration and harshness (NVH) issues, less tolerance and critical balance lever requirements, and enhanced overall turbocharger efficiency due to decreased bearing power loss.

Because the tilting pads 80 are formed separately from the outer ring 60, machining of the tilting pads 80 and the outer ring 60 is simple and inexpensive relative to manufacture of some single-piece tiling pad journal bearing systems such as, but not limited to, those in which the individual bearing pads are cut from an inner surface using EDM processes. The tilting pads 80 and the outer ring 60 may be formed of the same material, but are not limited to this configuration.

Figure 5:
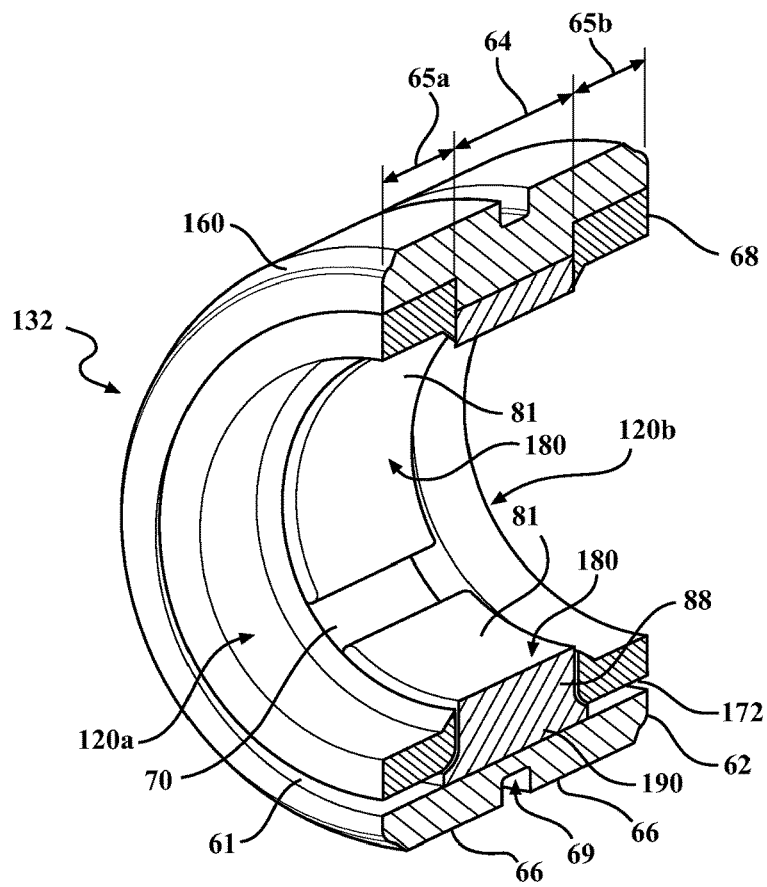
FIG. 5 is an axially cross-sectioned perspective view of an alternative embodiment tilting pad journal bearing.

Referring to FIGS. 5-7, an alternative embodiment, fully-floating ring TP journal bearing 132 can be used to support the shaft 24 for rotation within the bore 28. The fully-floating ring TP journal bearing 132 includes a cylindrical outer ring 160, tilting pads 180 that are secured to the inner surface 68 of the outer ring 160, and a pair of retaining rings 120a, 120b disposed within the outer ring 160 adjacent the tilting pads 180. The retaining rings 120a, 120b retain the tilting pads 180 within the outer ring 160 and improve bearing function, as discussed further below. The outer ring 160 and the tilting pads 180 are similar to the outer ring 60 and the tilting pads 80 described above with respect to FIGS. 3 and 4. For this reason, some common reference numbers will be used to refer to some common elements, and the description of common elements will be omitted where suitable.

In particular, the tilting pads 180 include an anchor portion 190 that is rectangular rather than polygonal. In addition, the outer ring 160 is slightly modified to accommodate this change in that a corresponding groove 172 that receives the anchor portion 190 is formed having a rectangular profile. In addition, the groove 172 extends axially from the outer ring first end 61 to the outer ring second end 62 such that it extends through the first end region 65a, the central region 64, and the second end region 65b. As in the previously described embodiment, the anchor portion 190 is press fit within the groove 172, whereby the tilting pads 180 are retained along the inner surface 68 of the outer ring 160.

The pair of retaining rings 120a, 120b disposed within the outer ring 160 includes a first retaining ring 120a that is press fit within the first end region 65a (see FIG. 5), and a second retaining ring 120b that is press fit within the second end region 65b (see FIG. 5). The retaining rings 120a, 120b are annular. Each of the retaining rings 120a, 120b have radially outward-facing surface 122a, 122b; respectively, that abut the inner surface 68 of the outer ring 160, and radially inward-facing surface 123a, 123b that face, and are spaced apart from, an outer surface 124b of the shaft 24. The retaining rings 120a, 120b have a radial dimension (e.g., thickness) such that the inward-facing surface 123a, 123b is recessed (e.g., disposed radially outward) relative to the inward-facing bearing surface 82 of the tilting pad 180. The first retaining ring 120a has an axially inward-facing surface 127a that abuts the first axial end 86 of the bearing member 81 and an axially outward-facing surface 125a that lies flush with the outer ring first end 61. Similarly, the second retaining ring 120b has an axially inward-facing surface 127b that abuts the second axial end 87 of the bearing member 81 and an axially outward-facing surface 125b that lies flush with the outer ring second end 62.

The axially inward-facing surface 127a, 127b of each retaining ring 120a, 120b includes an angled portion 126a, 126b that adjoins the inward-facing surface 123a, 123b thereof. The retaining ring angled portion 126a, 126b mates with a corresponding complementary web angled portion 89a, 89b formed on the radially-extending web 88 of the tilting pads 180. The engagement of the retaining ring angled portions 126a, 126b with the corresponding web angled portions 89a, 89b urges the anchor portion 190 radially outward and into the groove 172, and retains it there. It is contemplated that the angled portion 126a, 126b and the complementary web angled portion 89a, 89b may be slightly radiused (as shown) or linear.

In use, the retaining rings 120a, 120b retain (e.g., positively lock) the tilting pads 180 in the desired radial and axial positions relative to the outer ring 160, and stabilize the tilting pads 180. In addition, the retaining rings 120a, 120b serve as axial oil dams that retain lubricating oil within the outer ring 160 and in the vicinity of the inward-facing bearing surface 82 of the bearing members 81. In some embodiments the retaining ring thickness is made less to provide less lubricating oil flow restriction, and in other embodiments, the retaining ring thickness is made greater to provide more lubricating oil flow restriction, depending on the requirements of the specific application. In this manner, the floating characteristics of the TP journal bearing 132 can be tuned to the requirements of the specific application. In any case, by providing the TP journal bearing 132 with retaining rings 120a, 120b, performance of the TP journal bearing 132 is improved by restricting lubricating oil flow through the journal bearing 132 that would otherwise flow axially out of the journal bearing 132. Moreover, by restricting lubricating oil flow, less lubricating oil is required by the turbocharger 10, reducing the burden on the oil system of the engine and/or vehicle. Among other advantages, restricting the lubricating oil flow permits use of a smaller oil pump since less flow is required.

Although the TP journal bearings 30, 32, 132 are described above as being fully floating, they are not limited to this configuration. For example, in some embodiments, the TP journal bearings 30, 32, 132 are semi-floating. In this regard, although the fully-floating TP journal bearings 32, 32, 132 include the tilting pads 80, 180 that are axially centered between the outer ring first and second ends 61, 62, they are not limited to this configuration. For example, in some embodiments (such as when provided as a semi-floating-type TP journal bearing), the bearings 30, 32, 132 may include two sets of the tilting pads 80, with one set of three, four, or more tilting pads 80 at the first end 61 of the outer ring 60, 160, and the other set of three, four, or more tilting pads 80 at the opposed second end 62 of the outer ring 60, 160. That is, the tilting pads 80 are formed at opposed ends of the journal bearing 30, 32, 132 and hence are in series.

Although the radially-extending web 88 is offset from a midpoint between the leading and trailing ends 84, 85 of the bearing member 81, it is not limited to this configuration. For example, in some embodiments the radially-extending web 88 is centered between the leading end 84 and the trailing end 85.

Although in FIGS. 3-7, the webs 88 support the bearing members 81 such that, in an unloaded state, the bearing member outward-facing surface 83 is generally equidistantly spaced apart from the ring inner surface 68 at all locations between the leading and trailing ends 84, 85, the tilting pads 80, 180 are not limited to this configuration. For example, each bearing member 81 may be connected to the corresponding radially-extending web 88 so as to be angled relative to the ring inner surface 68 in an unloaded state. In some embodiments, the bearing members 81 may further be formed having a wedge shape in cross section so that one end (e.g., the leading end 84 or trailing end 85) of the bearing member 81 is closer to the ring inner surface 68 than the opposed end. In another example, the radius defined by the bearing member 81 can be made slightly larger than that of the inner diameter of the outer ring 60, whereby there is more clearance between the bearing member 81 and the outer ring inner surface 68 in the vicinity of the radially-extending web 88 than in the vicinity of the leading and trailing ends 84, 85 of the bearing member 81.

Although the retaining rings 120a, 120b are press-fit within the outer ring 160, the retaining rings 120a, 120b are not limited to this configuration. For example, in some embodiments, the retaining rings 120a, 120b may be secured to the inner surface 68 of the outer ring 160 via fasteners, adhesive, threaded engagement, or other suitable methods and/or devices.

Selected illustrative embodiments of the invention are described above in some detail. It should be understood that only structures considered necessary for clarifying the journal bearings and lubrication system have been described herein. Other conventional structures, and those of ancillary and auxiliary components of the system, are assumed to be known and understood by those skilled in the art. Moreover, while working examples of the journal bearings and lubrication system have been described above, the journal bearings and lubrication system are not limited to the working examples described above, but various design alterations may be carried out as set forth in the claims.

What is claimed is:

1. A journal bearing (30, 32, 132) comprising
   a cylindrical outer ring (60, 160) that includes
      a first end (61),
      a second end (62),
      a longitudinal axis (63) that extends through the first end (61) and the second end (62),
      a radially outward-facing bearing surface (66), and
      an inner surface (68) opposed to the radially outward-facing bearing surface (66),
      the inner surface (68) including an axially extending groove (72, 172), and
   a tilting pad (80, 180) that includes
      a bearing member (81) that is elongated in a circumferential direction and provides a radially inward facing bearing surface (82),
      an anchor portion (90, 190),
      a web (88) that connects the bearing member (81) to the anchor portion (90, 190), wherein the anchor portion (90, 190) is disposed in the groove (72, 172) in such a way that the tilting pad (80, 180) is secured to the outer ring (60, 160), and the bearing member (81) is pivotable about the web (88) relative to the inner surface (68) of the outer ring (60, 160),
      wherein the groove (72) is blind relative to the outer ring first end (61) and the outer ring second end (62).

2. The journal bearing (30, 32) of claim 1, wherein the anchor portion (90) is press fit within the groove (72).

3. The journal bearing (30, 32) of claim 1, wherein the anchor portion (90) has a pentagonal profile, and the groove (72) has a curved profile.

4. The journal bearing (30, 32, 132) of claim 1, wherein the web (88) is disposed closer to a trailing end (85) of the bearing member (81) than to a leading end (84) of the bearing member (81) relative to a direction of rotation of the shaft (24).

5. The journal bearing (132) of claim 1, further comprising a retaining ring (120a) disposed within the outer ring (160), the retaining ring (120a) configured to retain the tilting pad (180) within the outer ring (160).

6. The journal bearing (132) of claim 5, wherein the retaining ring (120a) is press fit within the outer ring (160).

7. The journal bearing (132) of claim 1, further comprising a retaining ring (120a) disposed within the outer ring (160), the retaining ring (120a) configured to urge the anchor portion (190) radially outward and into the groove (172).

8. The journal bearing (132) of claim 1, further comprising a retaining ring (120a) disposed within the outer ring (160), the retaining ring (120a) configured to control the flow of lubricating oil within the journal bearing (132).

9. The journal bearing (132) of claim 1, further comprising a first retaining ring (120a) disposed within the outer ring (160) on a first end (61) of the flexure pivot tilting pad (180) and a second retaining ring (120b) disposed within the outer ring (160) on a second end (62) of the tilting pad (180).

10. A journal bearing (132) comprising
    a cylindrical outer ring (160),
    tilting pads (180) disposed within the outer ring (160),
    a first retaining ring (120a) disposed within the outer ring (160) on a first axial side of the tilting pads (180), and
    a second retaining ring (120b) disposed within the outer ring (160) on a second axial side of the tilting pad (180),
    wherein the first retaining ring (120a) and the second retaining ring (120b) are configured to secure the tilting pads (180) within the outer ring (160) and wherein the first retaining ring (120a), the second retaining ring (120b), or both the first retaining ring (120a) and the second retaining ring (120b) are configured to control the flow of lubricating oil within the journal bearing (132).

11. A turbocharger (10) comprising
    a turbine wheel (14),
    a compressor impeller (18), and
    a shaft (24) that connects the turbine wheel (14) to the compressor impeller (18),
    the shaft (24) supported for rotation within a bearing housing (22) via a journal bearing (30, 32, 132), the journal bearing (30, 32, 132) comprising
        a cylindrical outer ring (60, 160) that includes
            a first end (61),
            a second end (62),
            a longitudinal axis (63) that extends through the first end (61) and the second end (62),
            a radially outward-facing bearing surface (66), and
            an inner surface (68) opposed to the radially outward-facing bearing surface (66),
        the inner surface (68) including an axially extending groove (72, 172), and
        a tilting pad (80, 180) that includes
            a bearing member (81) that is elongated in a circumferential direction and provides a radially inward facing bearing surface (82),
            an anchor portion (90, 190),
            a web (88) that connects the bearing member (81) to the anchor portion (90, 190),
            wherein the anchor portion (90, 190) is disposed in the groove (72, 172) in such a way that the tilting pad (80, 180) is secured to the outer ring (60, 160), and the bearing member (81) is pivotable about the web (88) relative to the inner surface (68) of the outer ring (60, 160), and wherein the axially extending groove (72) is blind relative to the outer ring first end (61) and the outer ring second end (62).

12. The turbocharger (10) of claim 11, wherein the anchor portion (90) is press fit within the groove (72).

13. The turbocharger (10) of claim 11, further comprising a retaining ring (120*a*) disposed within the outer ring (160), the retaining ring (120*a*) configured to urge the anchor portion (190) radially outward and into the groove (172).

14. The turbocharger (10) of claim 11, further comprising a first retaining ring (120*a*) disposed within the outer ring (160) on a first axial side of the tilting pad (180) and a second retaining pad (120*b*) disposed within the outer ring (160) on a second axial side of the tilting pad (180).

* * * * *